(12) United States Patent
Kenchammana-Hosekote et al.

(10) Patent No.: US 8,910,156 B1
(45) Date of Patent: Dec. 9, 2014

(54) VIRTUAL MACHINE DEPENDENCY

(75) Inventors: Deepak Kenchammana-Hosekote, Mountain View, CA (US); Eric Paul Forgette, Mechanicsville, VA (US); Shravan Gaonkar, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 875 days.

(21) Appl. No.: 13/097,813

(22) Filed: Apr. 29, 2011

(51) Int. Cl.
*G06F 9/455* (2006.01)

(52) U.S. Cl.
USPC .................................................. 718/1

(58) Field of Classification Search
None
See application file for complete search history.

(56) References Cited

U.S. PATENT DOCUMENTS

| | | | | |
|---|---|---|---|---|
| 2009/0249354 A1* | 10/2009 | Yamaguchi et al. | ........... | 718/106 |
| 2010/0325628 A1* | 12/2010 | Haga et al. | ......................... | 718/1 |
| 2012/0011505 A1* | 1/2012 | Fujisaki et al. | .................... | 718/1 |

* cited by examiner

*Primary Examiner* — Qing Wu
(74) *Attorney, Agent, or Firm* — Cooper Legal Group, LLC

(57) ABSTRACT

One or more techniques and/or systems are provided for describing virtual machine dependencies. In particular, data objects, such as virtual hard drives, associated with virtual machines may be identified and/or examined to identify data structures, such as configuration files, comprising configuration data. The configuration data may be analyzed to determine dependency relationships between virtual machines to describe virtual machine dependencies. Identifying virtual machine dependencies, among other things, allows virtual machines that are no longer used to be repurposed, deleted, reset, etc. with little to no adverse effect on other virtual machines.

22 Claims, 11 Drawing Sheets

VIRTUAL MACHINE DEPENDENCY

FIELD

The instant disclosure pertains to describing dependencies between virtual machines.

BACKGROUND

Virtual machines allow many computing environments (e.g., general desktop environments, database servers, web services, etc.) to be implemented within one or more host computing devices. A virtual machine may comprise its own operating system, applications, and configurations. As such, a virtual machine may function as a self-contained computing environment (even though it is virtual rather than physical). Moreover, one or more virtual machines may be instantiated on a single host computing device, such as a desktop, laptop, server, storage controller, etc.

Virtual machines essentially share resources of physical host computing devices and can run applications software, etc. to accomplish tasks, such as testing, etc. that may otherwise be inefficient to perform in the absence of virtual machines. For example, if different variations of a website are to be tested, respective versions of the website may be hosted on different virtual machines to allow for concurrent testing, for example. Moreover, since virtual machines are virtual (e.g., do not actually comprise physical components themselves) they may be somewhat disposable such that they may be reset, disposed of, etc. (e.g., if respective versions of website they are hosting produce undesirable results). Nevertheless, virtual machines may rely on one another, such as where a website hosted by a first virtual machine may use data from a second virtual machine.

Unfortunately, since virtual machines are relatively easy and inexpensive to create, it is not uncommon for additional virtual machines to be created instead of resetting, deleting, etc. existing virtual machines. Thus, many virtual machines may accumulate where the importance, relevance, purpose, etc. of respective virtual machines may be lost or forgotten. However, because virtual machines may depend upon one another, merely deleting, resetting, etc. virtual machines may be problematic as deleting one virtual machine may adversely affect another virtual machine (e.g., if a first virtual machine providing data to a second virtual machine is deleted, then the second virtual machine may not function properly due to the missing data). Interdependencies between virtual machines may not be readily apparent as the number of virtual machines scale quickly from the addition of new virtual machines over time. Thus, while it may be desirable to remove or suspend many virtual machines (e.g., for housekeeping and/or other purposes), that may not be possible without adversely affecting at least some remaining virtual machines.

SUMMARY

Virtual machine dependencies may be described as provided herein. In particular, data objects, such as virtual hard drives, associated with virtual machines may be identified. It may be appreciated that a data object may be any object associated with a virtual machine, such as a virtual hard drive of the virtual machine, a virtual machine file comprising an operating system and/or application binaries of the virtual machine, a metadata file describing the virtual machine, etc. Such data objects may be examined to identify data structures, such as one or more configuration files, comprising configuration data. It may be appreciated that a data structure may be any structure that may comprise configuration data associated with the virtual machine, such as application configuration files for applications installed on the virtual machine, operating system configuration files for an operating system of the virtual machine, network configuration files of the virtual machine, and/or other structures comprising configuration data associated with the virtual machine.

The configuration data may be analyzed to determine dependency relationships between virtual machines to describe virtual machines dependencies. For example, a virtual machine dependency may describe how a website of a first virtual machine may use data from a database hosted by a second virtual machine. Identifying virtual machine dependencies, among other things, provides the basis for service outage planning such as guest operating system patching. Identifying virtual machine dependencies also allows virtual machines that are no longer used to be repurposed, deleted, reset, etc. with little to no adverse effect on other virtual machines.

It may be appreciated that while virtual machines are discussed herein that one or more systems and/or techniques, etc. described herein are not limited to virtual machines, but may be applicable to dependency relationships, for example, between any computing devices (e.g., virtual machine to non-virtual machine, non-virtual machine to non-virtual machine, etc.). For example, a dependency between a first computing device (e.g., a laptop) and a second computing device (e.g., an email server) may be described based upon a dependency relationship between an email program on the first computing device referencing an email server on the second computing device. In particular, a data object, such as a hard drive, of the first computing device may be identified. The hard drive may be examined (e.g., queried, parsed, crawled, interrogated, etc.) to determine an email configuration file comprising configuration data of the email program. The configuration data may be analyzed to determine a dependency relationship between the first computing device (e.g., a laptop) and the second computing device (e.g., email server), which may be used to describe the dependency between the first and second computing devices. Accordingly, even though virtual machine and/or the like are used herein, including in the claims, such terms are not meant to be limited to virtual machines per se, but are intended to cover other machines, computing devices, etc. as well that may or may not be virtual. It may also be appreciated that one or more of the actions and/or components described herein may be located in and/or performed by any number of devices, systems, modules, etc. (e.g., as implementation thereof may take the form of hardware and/or software). For example, as described below at least with regard to FIGS. 1 and 2, one or more of the actions and/or components described herein may be located in, performed by, implemented in any part or parts of a networked (or non-networked) environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
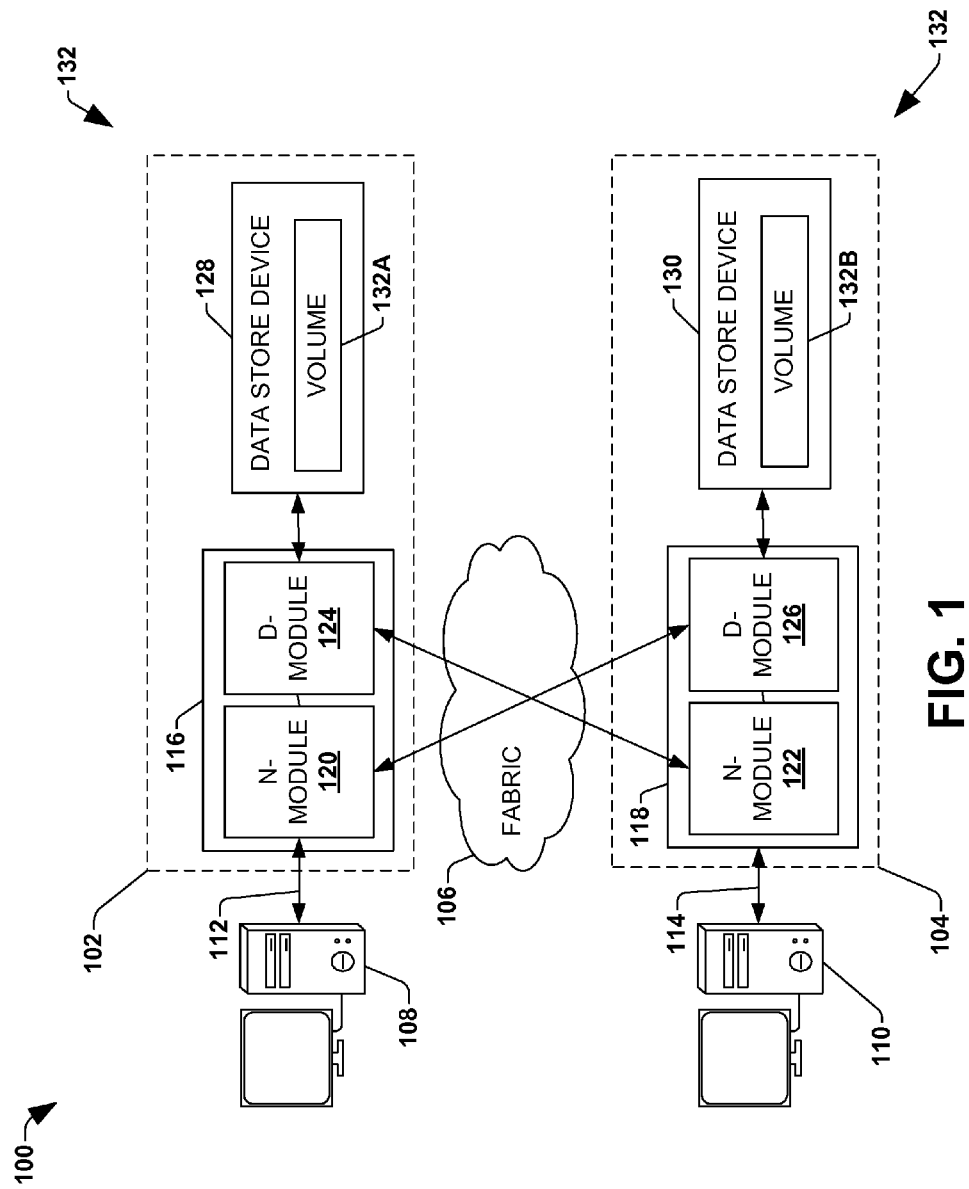
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Computing environments, such as a desktop and/or server environment, may be implemented within virtual machines. In particular, a virtual machine may be configured as a self-contained computing environment. The virtual machine may comprise an operating system, applications, data, and its own configuration. For example, a virtual machine may be implemented as a database server with a server operating system and a database. A host computing device, such as a desktop, server, or storage controller, may host one or more virtual machines. It may be appreciated that a storage controller as used herein may comprise any host computing device or machine, such as a server, an enterprise-wide storage server, a desktop computer, a laptop computer, and/or other computing devices configured to store and/or access data (e.g., clients 108, 110 and/or data storage systems 102, 104 of FIG. 1; node 202 and/or client 205 of FIG. 2; etc.).

It will be appreciated that virtual machines may rely upon one another. For example, a first virtual machine may host a retail application that sends credit card information to a creditor verifying service hosted by a second virtual machine for verification. Such dependency relationships between virtual machines may be difficult to identify and track because virtual machines may be added, removed, and/or reconfigured over time. Conventional techniques may implement an additional injection component in an attempt to track such dependency relationships. However, an injection component may require a network switch to re-direct network communication traffic between virtual machines through the injection component. In this way, the injection component may inject tracking information in order to determine which virtual machines are communicating with one another, and why. However, the injection component may compromise efficiency and/or security because the injection component may be an additional component through which the network traffic is routed. If the injection component cannot keep pace with the network traffic, then the injection component may become a bottleneck. In addition, the injection component may be vulnerable to security breaches, and could expose network traffic to attacks.

Accordingly, one or more systems and/or techniques for describing virtual machine dependencies are provided herein (e.g., without the use of an additional injection component). In particular, data objects (e.g., virtual hard drive) associated with virtual machines may be identified and searched for data structures (e.g., configuration files) comprising configuration data (e.g., a reference to a virtual machine). The configuration data may be analyzed to determine dependency relationships between virtual machines. For example, a first virtual machine may have a dependency relationship with a second virtual machine based upon the first virtual machine referencing a database instance hosted by the second virtual machine. Thus, a virtual machine dependency may be described regarding the dependency relationship between the first and second virtual machines. One or more virtual machine dependencies may be correlated into a mapping of virtual machine dependencies indicative of dependency relationships between one or more virtual machines hosted by a storage controller.

Figure 2:
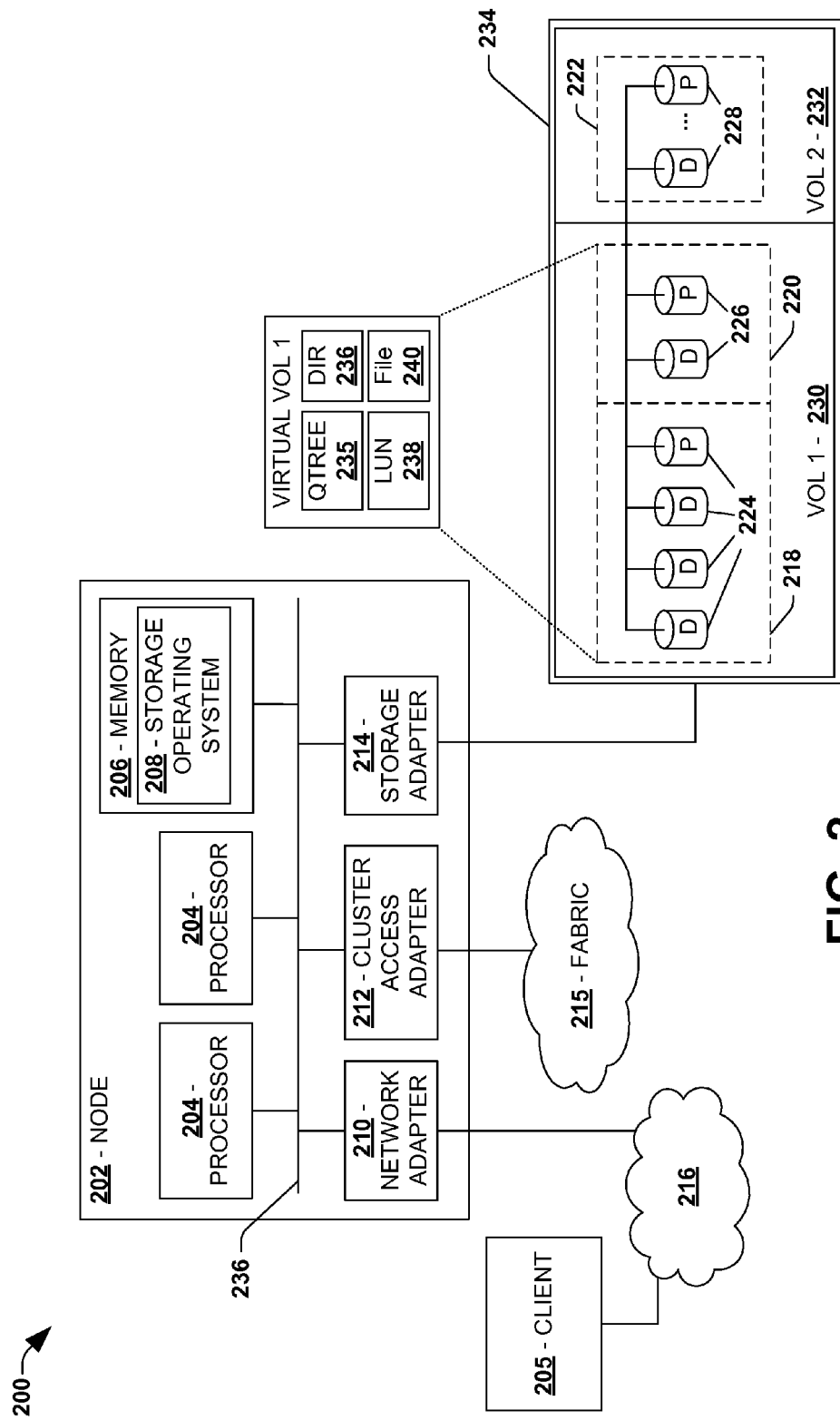
FIG. 2 is a component block diagram illustrating an example data storage system in accordance with one or more of the provisions set forth herein.

To provide a context for an embodiment for describing a virtual machine dependency, FIG. 1 illustrates a clustered network environment 100, and FIG. 2 illustrates an embodiment of a data storage system that may be implemented to store and manage data, such as virtual machine data objects, in this clustered network environment. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that one or more virtual machines may be implemented within environment 100. In one example, data storage systems 102, 104 and/or clients 108, 110 may host virtual machines accessible to one another and/or to other devices, virtual machines, etc. It may be appreciated that any host computing device may host virtual machines (e.g., serve as a controller). Such virtual machines implemented within environment 100 may have dependency relationships with one another. That is, a virtual machine may rely upon data, services, etc. from another virtual machine. In this way, it may be advantageous to describe virtual machine dependencies between such virtual machines. Moreover, one or more of the actions (e.g., per FIGS. 4 and 5) and/or components (e.g., per FIG. 8) described herein may be located in and/or performed anywhere (e.g., by any part(s)) across the environment 100 (e.g., as implementation may take the form of hardware and/or software).

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that one or more virtual machines may be implemented within data storage system 200. In one example, node 202 may host one or more virtual machines initialized on virtual hard drive data objects stored across at least some of data storage devices 234. In another example, client 205 may host one or more virtual machines. It may be appreciated that any host computing device may host virtual machines (e.g., serve as a controller). Such virtual machines may have dependency relationship between one another (e.g., a first virtual machine may access a web service of a second virtual machine; the second virtual machine may access a database of a third virtual machine; etc.). These dependency relationships may be determined from analyzing configuration data of data structures within data objects of the virtual machines. Virtual machine dependencies may be described from the dependency relationships. Moreover, one or more of the actions (e.g., per FIGS. 4 and 5) and/or components (e.g., per FIG. 8) described herein may be located in and/or performed anywhere (e.g., by any part(s)) across the system 200 (e.g., as implementation may take the form of hardware and/or software).

Figure 3:
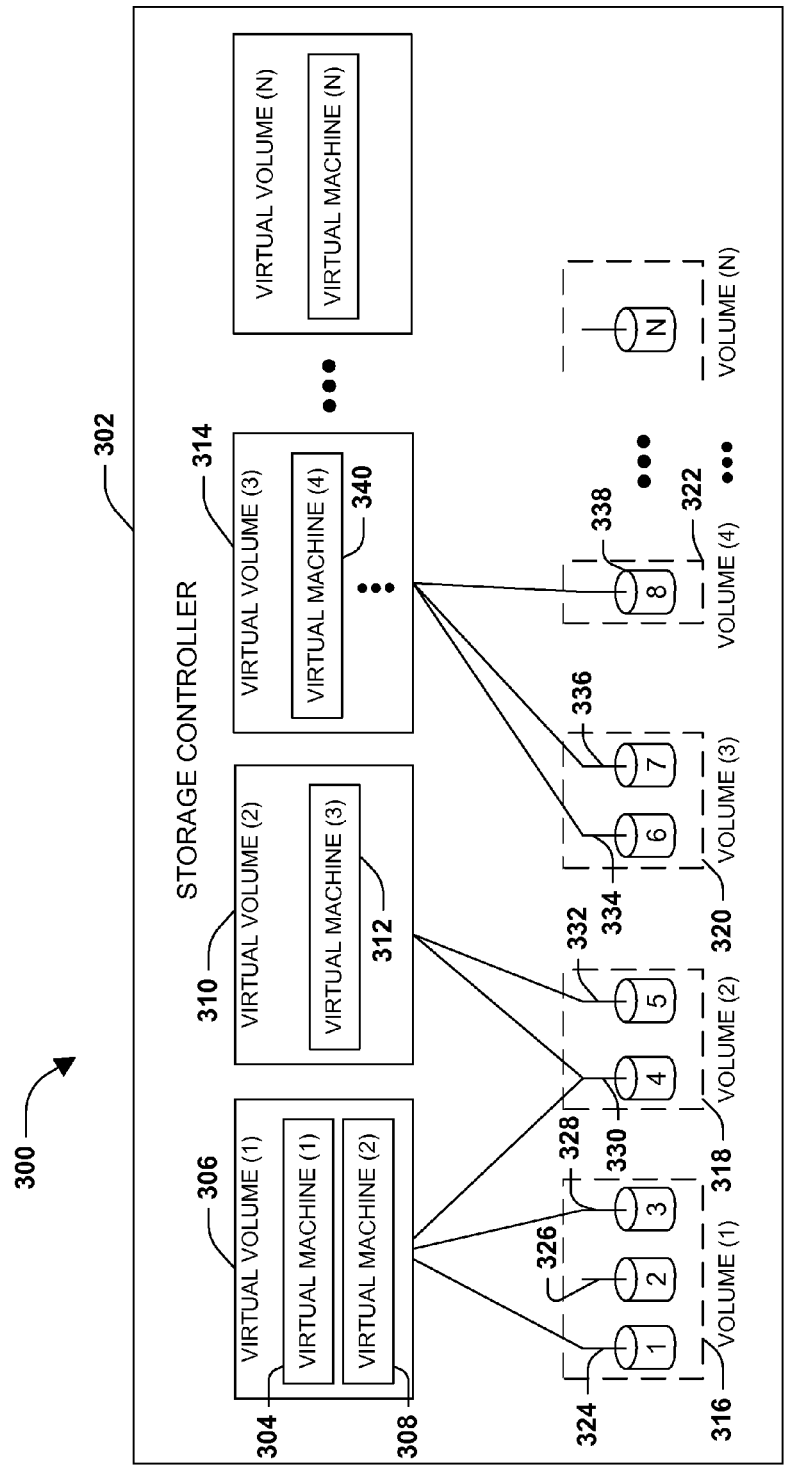
FIG. 3 is an example of a storage controller.

FIG. 3 illustrates an example 300 of a storage controller 302. The storage controller 302 may be configured as a host computing device configured to host one or more virtual machines. For example, the storage controller 302 may comprise a hypervisor configured to host a virtual machine by making a virtual hard drive data object available to the virtual machine. The virtual hard drive data object may be comprised of data stored on shared storage of the storage controller 302 (e.g., a virtual hard drive data object may be comprised within a virtual volume spread across one or more physical storage devices). Virtual machine data (e.g., guest operating system, application binaries, and/or other data of the virtual machine) may be configured within the virtual hard drive data object.

In one example, the storage controller 302 may store information on one or more storage "volumes", such as storage volume (1) 316, storage volume (2) 318, storage volume (3) 320, storage volume (4) 322, and/or "N" other storage volumes, where N is a positive integer. A storage volume may be comprised of one or more storage devices, such as a cluster of disks. For example, storage volume (1) 316 may be comprised of storage device (1) 324, storage device (2) 326, and/or storage device (3) 328. Storage volume (2) 318 may be comprised of storage device (4) 330 and/or storage device (5) 332. Storage volume (3) 320 may be comprised of storage device (6) 334 and/or storage device (7) 336. Storage volume (4) 322 may be comprised of storage device (8) 338.

The storage controller 302 may be configured to host one or more virtual machines within respective virtual volumes (e.g., configured as controller objects on the storage controller 302). For example, storage controller 302 may store virtual machine (1) 304 and virtual machine (2) 308 on virtual volume (1) 306, virtual machine (3) 312 and/or other virtual machines on virtual volume (2) 310, virtual machine (4) 340 on virtual volume (3) 314, etc. The virtual machines may be represented within the virtual volumes as data objects, such as metadata files and/or virtual hard drive data objects, etc. Because it may not be readily apparent as to which virtual machines are represented by respective data objects, an application programming interface (API) may be consulted to discover which data objects represent which virtual machines. In this way, data objects representative of virtual machines may be identified.

In one example, a virtual volume may be stored over an aggregate of disparate portions of various physical storage devices. For example, virtual volume (1) 306 may be stored on at least some of storage device (1) 324, storage device (3) 328, and/or storage device (4) 330. Virtual volume (2) 310 may be stored on at least some of storage device (4) 330 and/or storage device (5) 332. Virtual volume (3) 314 may be stored on at least some of storage device (6) 334, storage device (7) 336, and/or storage device (8) 338. In this way, a virtual volume is not "tied" to any particular storage device, but instead may be a layer of abstraction or virtualization, which allows the virtual volume to be resized and/or flexible in some regards. Unfortunately, tracking and/or analyzing virtual machine configurations and/or dependency relationships between virtual machines on such virtual volumes may be difficult at least because of such abstraction. It will be appreciated that in one example, at least some of one or more systems and/or techniques (e.g., per FIGS. 4, 5 and 8) for describing, identifying, defining, discovering, etc. virtual machine dependencies may be implemented (e.g., as hardware and/or software) within at least some of storage controller 302 (e.g., via an application, component, etc. executing therein/thereon).

Figure 4:
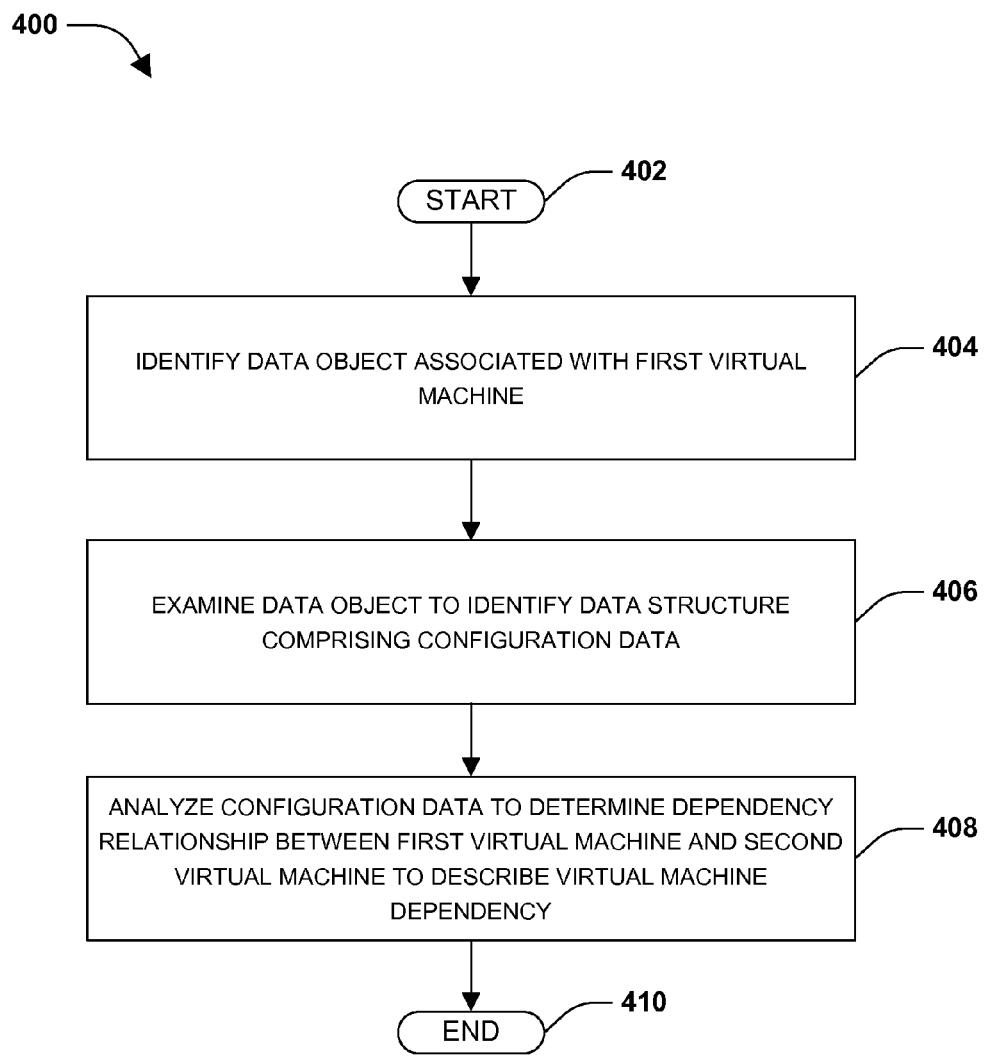
FIG. 4 is a flow chart illustrating an exemplary method of describing a virtual machine dependency.

One embodiment of describing a virtual machine dependency as provided herein is illustrated by an exemplary method 400 in FIG. 4. At 402, the method starts. At 404, a data object associated with a first virtual machine may be identified. For example, metadata of a host computing device, such as a storage controller, may be consulted to identify a virtual hard drive data object comprising a guest operating system, applications, and/or virtual machine data of the first virtual machine. It may be appreciated that a data object may be any object associated with a virtual machine, such as a virtual hard drive of the virtual machine, a virtual machine file comprising an operating system and/or application binaries of the virtual machine, a metadata file describing the virtual machine, etc. It may be appreciated that one or more data objects associated with a virtual machine may be identified.

It may be appreciated that in one example, a data object may be identified by searching a host computing device configured to host virtual machines for a virtual hard drive data object comprising an operating system and/or application binaries of a virtual machine. In one example, a host file system of the host computing device may be searched for data objects comprising well known virtual hard drive extensions (e.g., .VHD, .VMDK, etc.) and/or well known virtual machine file extensions (e.g., .VMC) to identify the data object. In another example, metadata associated with virtual machine manager software (e.g., a hypervisor) may be examined for indications of virtual machines hosted by the virtual machine manager software (e.g., a hypervisor may maintain a list of virtual machines hosted by the hypervisor).

At 406, the data object may be examined to identify a data structure comprising configuration data. In one example, the data object may be examined to identify data structures comprising configuration data of the first virtual machine (e.g., a virtual hard drive data object comprising a file structure, operating system, applications, and/or virtual data of the first virtual machine may be examined). It may be appreciated that in on example, the data object may be directly examined, without having to perform additional actions to initialize and examine the virtual machine identified by the data object. For example, a virtual machine file may be directly examined, as opposed to booting up and logging into a guest operating system, for example, of the virtual machine to examine the virtual machine to determine dependency relationships. Directly examining a data object representative of a virtual machine to determine dependency relationships may be faster, more scalable, and/or efficient, etc. than other examination or interrogation techniques (e.g., using a guest operating system), which may require additional time, resources, and/or credentials, etc. to initialize and perform the interrogation. The data structure may be a wide variety of structures, such as an operating system registry, a database file, an application configuration file, a network configuration file, a storage configuration file, an operating system configuration file, and/or other structures that may comprise configuration data associated with the virtual machine. For example, a virtual hard drive data object of a database server virtual machine may be examined to indentify data structures, such as a network configuration file, a database file, and/or an operating system registry.

It may be appreciated that in one example, a data object may be examined to identify a data structure by opening the data object (e.g., opening a virtual hard drive .VHD file using a storage controller API configured to open files regardless of their file types), and querying a guest file system (e.g., a file system of a virtual machine) within the data object for data structures, such as well known configuration files (e.g., application configuration files such as: tnsnames.ora, sqlnet.ora, nwbcclient.ini, and notes.ini; storage and network configuration files such as: fstab and iscsi.config; registry files; and/or other configuration files). In particular, partition information of the guest file system and/or guest file system metadata may be interpreted to locate and/or gain access to data structures within the data object, which may be searched for data structures that may comprise configuration data. In this way, data structures, such as configuration files that may comprise configuration data, may be identified by searching the exposed guest file system within the data object.

In one example of examining a data object, a storage controller may host one or more virtual machines. The storage controller may comprise a storage controller API configured to open a variety of data objects (files) and/or luns regardless of their file types. For example, the storage controller API may be configured to open a virtual hard drive data object comprising a guest file system of a virtual machine (e.g., a guest file system comprising a guest operating system and/or application binaries of a virtual machine). Once opened, a master boot record (e.g., a boot record stored within the first 512 bytes of the virtual hard drive data object) may be read to locate the guest file system of the virtual machine. For example, a partition table within the master boot record may specify the start of the guest file system within the virtual hard drive data object. The guest operating system may comprise guest file system metadata that may be examined for a description of data structures (files) comprised within the guest file system. A find operation may be performed to query the guest file system metadata for data structures (well known configuration files) that may comprise configuration data of the virtual machine. To locate data blocks within the virtual hard drive data object comprising the data structures, a master file table within the guest file system may be queried using the data structure file names to locate data blocks comprising the data structures. In this way, data structures may be analyzed at the corresponding data blocks for configuration data (e.g., a tnsnames.ora data structure may be opened using a text editor to search for references to virtual machines).

At 408, the configuration data may be analyzed to determine a dependency relationship between the first virtual machine and a second virtual machine to describe a virtual machine dependency. In one example, a dependency relationship between a first virtual machine configured as a website server and a second virtual machine configured as a database server may be determined based upon a web page configuration file of the first virtual machine referencing a database of the second virtual machine. It may be appreciated that a virtual machine dependency may be described based upon one or more dependency relationships, such as shared drive mappings, database references, web service references, network connection references, etc. Configuration data from various data structures may be confirmed with one another. In one example, configuration data found within an application file data structure may be confirmed at least in part upon information from a guest operating system configuration data structure.

It may be appreciated that in one example, configuration data may be analyzed to determine a dependency relationship by opening the data structure (e.g., open a text based configuration file with a text editor, and search the configuration file with a text parsing technique), and searching the contents of the data structure for references to virtual machines (e.g., a textual search of a configuration file may be performed to locate a reference to a virtual machine, which may indicate a dependency relationship with the virtual machine).

In one example, the first virtual machine, the second virtual machine, and/or other virtual machines may be hosted within a storage controller. An operational decision may be performed for the storage controller to perform operational functions, such as maintenance of the storage controller, modification of a virtual machine hosted by the storage controller, modification of an application of a virtual machine, modification of a service provided by a virtual machine, etc. The operational decision may be implemented for the storage controller based upon the virtual machine dependency describing the dependency relationships between the first virtual machine and the second virtual machine. For example, before implementing an operational decision to delete the second virtual machine, the virtual machine dependency may be consulted. The virtual machine dependency may indicate that the first virtual machine has a dependency relationship with the second virtual machine regarding a database instance provided by the second virtual machine. Thus, the operational decision may be modified to retain the second virtual machine.

It may be appreciated that one or more virtual machine dependencies may be described for various virtual machines. The one or more virtual machine dependencies may be correlated into a mapping of virtual machine dependencies indicative of dependency relationships between one or more virtual machines hosted by a storage controller. For example, a mapping of virtual machine dependencies may describe a first virtual machine's web page referencing a second virtual machine's database instance, a third virtual machine's application referencing the second virtual machines database instance, the second virtual machine's database instance referencing a fourth virtual machine's web server, and/or other various dependency relationships. It may be appreciated that the mapping of virtual machine dependencies may be described in a variety of ways. In one example, the mapping of virtual machine dependencies may be described as a graph, where nodes may represent virtual machines and edges may represent virtual machine dependencies.

It may be appreciated that virtual machine dependencies may be correlated in a variety of ways to create a mapping of virtual machine dependencies. In one example, virtual machine dependencies may be correlated to create the mapping by creating a graph, where nodes may represent virtual machines and edges (between nodes) may represent virtual machine dependencies. In this way, the graph may illustrate what virtual machines are depended upon by other virtual machines, which may be useful to determine which virtual machines may be affected by changes to another virtual machine. In another example, virtual machines dependencies may be stored within a list (e.g., a text document comprising a list of virtual machines, along with dependency relationships of respective virtual machines) and/or a grid (e.g., mapping of virtual machine dependencies 902 of FIG. 9). The mapping may be used by an administrator to implement an operational decision based upon which virtual machines may be affected by changes to another virtual machine. For example, a modification of a database instance hosted by a first virtual machine may affect a website hosted by a second virtual machine that consumes data from the database instance (e.g., the second virtual machine may have a virtual machine dependency relationship with the first virtual machine). In this way, an operational decision to shut down or restart the first virtual machine may be delayed based upon the dependency relationship, which may be specified within a mapping of virtual machine dependencies.

It may be appreciated that one or more mappings of virtual machines may be created over time. A first mapping of virtual machine dependencies may be compared with a second mapping by determining whether virtual machine dependency for a virtual machine have changed between the first mapping and the second mapping. For example, a second virtual machine may depend upon a first virtual machine within a first mapping as illustrated by a virtual machine dependency entry within the first mapping. However, a second mapping (created later in time) may not comprise the virtual machine dependency entry, and thus the second virtual machine may not depend upon the first virtual machine anymore (e.g., a reference to a database instance hosted by the first virtual machine may have been deleted from the second virtual machine).

The mapping of virtual machine dependencies may be updated with one or more virtual machine dependencies. For example, a new virtual machine may be added to the storage controller. Virtual machine dependencies for the new virtual machine may be described based upon dependency relationships between the new virtual machine and other virtual machines within the storage controller (e.g., the new virtual machine may access a web service hosted by a fifth virtual machine). In this way the mapping of virtual machine dependencies may be updated with dependency relationships of the new virtual machine.

A second mapping of virtual machine dependencies may be created. For example, one or more new virtual machine dependencies may be correlated into the second mapping of virtual machine dependencies. The one or more new virtual machine dependencies may be described from similar or different dependency relationships from the mapping of virtual machine dependencies. The mapping of virtual machine dependencies may be compared with the second mapping of virtual machine dependencies to determine one or more virtual machine relationship changes between one or more virtual machines. In this way, configuration changes associated with virtual machine dependencies may be identifiable. At 410, the method ends.

It may be appreciated that multiple resources may be leveraged when determining dependency relationships for describing virtual machine dependencies. For example, hypervisors (e.g., a virtual machine monitor), domain name system (DNS) servers, light weight directory access protocol (LDAP) servers, network switches, management servers (e.g., vCenter), and/or other resources may be consulted to determine dependency relationships between virtual machines. In one example, a plurality of virtual machines may be configured in overlapping but separate networks based upon a networking scheme that leverages network address translations (NAT) at network intersections. For example, a first virtual machine, a second virtual machine, and/or other virtual machines may be hosted within a first virtual local area network (VLAN). A third virtual machine and/or other virtual machines may be hosted within a second VLAN. The first virtual machine may comprise a first reference to a first resource hosted by the second virtual machine with an IP address of 10.1.1.2. The third virtual machine may comprise a second reference to a second resource on a resource with an IP address of 10.1.1.2. A DNS server, LDAP server, a hypervisor, and/or other resources may be consulted to determine that the third virtual machine depends upon the second resource at IP address 10.1.1.2, but not the first resource at 10.1.1.2. In this way, it may be determined that the first virtual machine and the third virtual machine may depend upon difference resources even though both virtual machines reference resources with an IP address of 10.1.1.2.

Figure 5:
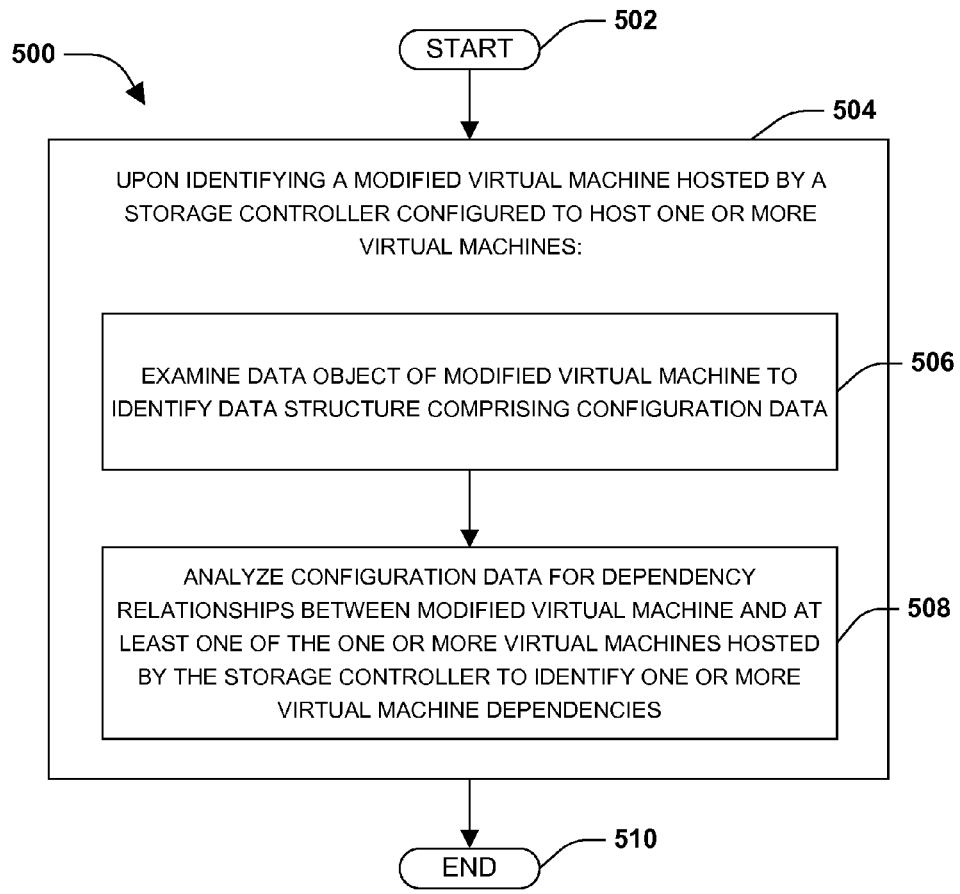
FIG. 5 is a flow chart illustrating an exemplary method of describing a virtual machine dependency.

One embodiment of describing a virtual machine dependency is illustrated by an exemplary method 500 in FIG. 5. At 502, the method starts. A storage controller configured as a host computing device may be configured to host one or more virtual machines. At 504, a modified virtual machine hosted by a storage controller may be identified (e.g., a virtual machine has been booted up to an on state; a data object of a virtual machine has a different file size; etc.). In one example, a configuration of a virtual machine may have been modified (e.g., an additional application may have been installed on the virtual machine, a role of the virtual machine may have been modified, a new operating system may have been installed on the virtual machine, etc.). In another example, a virtual machine may have been added to the storage controller as the modified virtual machine. At 506, a data object of the modified virtual machine may be examined to identify a data structure comprising configuration data. For example, a virtual hard drive data object may be examined for application configuration files, operating system configuration files, network configuration files, registry entries, and/or other data structures comprising configuration data.

At 508, the configuration data may be analyzed for dependency relationships between the modified virtual machine and at least one of the one or more virtual machines hosted by the storage controller to identify one or more virtual machine dependencies. That is, the configuration data may be read to determine a dependency relationship between the modified virtual machine and another virtual machine hosted by the storage controller. The dependency relationship may be used to identify a virtual machine dependency. For example, a new virtual machine may be initialized on the storage controller as a modified virtual machine. The modified virtual machine may comprise an online photo album application. The online photo album application may be associated with a network configuration file (data structure) comprising network configuration data for the online photo album application. The network configuration data may be analyzed for a dependency relationship between the modified virtual machine and another virtual machine. For example, a dependency relationship may be discovered based upon the network configuration data comprising an entry of the online photo album application referencing a photo repository hosted by another virtual machine. In this way, one or more virtual machine dependencies may be identified.

It may be appreciated that a mapping of virtual machine dependencies for the storage controller may have been created. The mapping of virtual machine dependencies may be compared with the one or more virtual machine dependencies associated with the modified virtual machine to determine one or more virtual machine relationship changes. For example, a first virtual machine may have referenced a database of a second virtual machine. The first virtual machine may have been modified, such that the first virtual machine references a database of a third virtual machine as opposed to the second virtual machine. In this way, a virtual machine relationship change may be determined based upon the first virtual machine having a dependency relationship with the third virtual machine, but not with the second virtual machine. An operational decision for the storage controller may be implemented based upon the virtual machine relationship change. For example, an operational decision to delete the third virtual machine may be modified to delete the second virtual machine instead of the third virtual machine because the database from the second virtual machine may have been migrated to the third virtual machine as illustrated by the virtual machine relationship change. At 510, the method ends.

Figure 6:
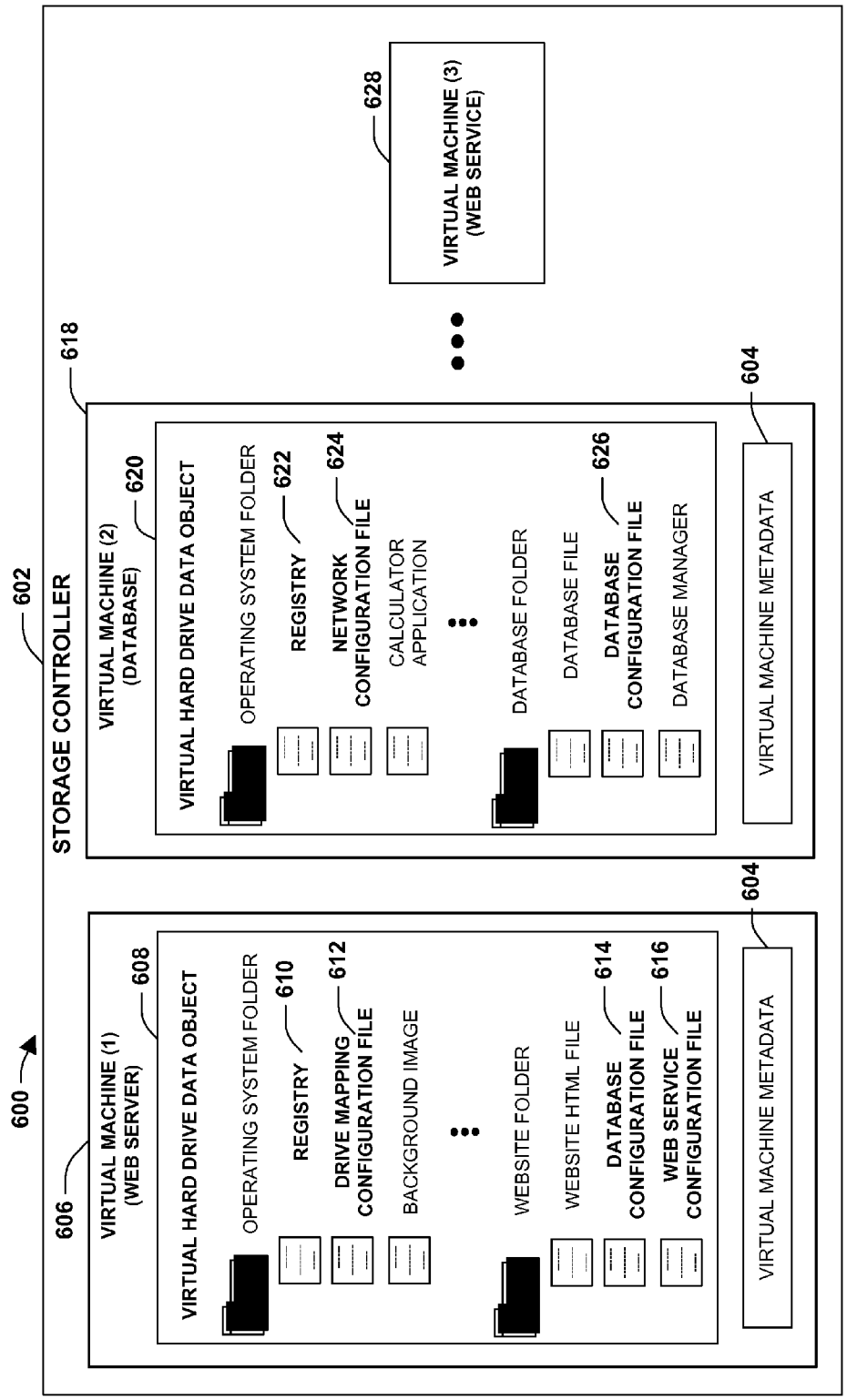
FIG. 6 is an example of a storage controller.

FIG. 6 illustrates an example 600 of a storage controller 602. The storage controller 602 may be configured as a host computing device (e.g., a desktop computer, laptop, server, enterprise-wide data storage system, etc.) to host one or more virtual machines associated with virtual hard drive data objects. For example, storage controller 602 may host virtual machine (1) 606 associated with virtual hard drive data object 608, virtual machine (2) 618 associated with virtual hard drive data object 620, and/or other virtual machines, such as virtual machine (3) 628. In one example, the virtual hard drive data objects may be stored across one or more storage devices associated with storage controller 602. The virtual machines hosted by storage controller 602 may be configured for various roles. For example, virtual machine (1) 606 may be configured as a web server, virtual machine (2) 618 may be configured as a database server, and virtual machine (3) 628 may be configured as a web service provider.

The storage controller 602 may comprise virtual machine metadata 604 for the one or more virtual machines. The virtual machine metadata 604 may be analyzed to indentify the virtual hard drive data objects associated with the virtual machines hosted by the storage controller 602. The virtual hard drive data objects may be examined to identify data structures comprising configuration data. In one example, virtual hard drive data object 608 may be examined to identify registry 610, drive mapping configuration file 612, database configuration file 614, web service configuration file 616, and/or other data structures comprising configuration data. Virtual hard drive data object 620 may be examined to identify registry 622, network configuration file 624, database configuration file 626, and/or other data structures comprising configuration data. The configuration data of the data structures may be analyzed to determine dependency relationships between the virtual machines to describe virtual machine dependencies.

In one example, database configuration file 614 within virtual hard drive data object 608 for virtual machine (1) 606 may be analyzed to determine that a website hosted by virtual machine (1) 606 references a database hosted by virtual machine (2) 618. In this way, a virtual machine dependency between virtual machine (1) 606 and virtual machine (2) 618 may be described. In another example, web service configuration file 616 may be analyzed to determine that the website hosted by virtual machine (1) 606 references a web service hosted by virtual machine (3) 628. In this way, a virtual machine dependency between virtual machine (1) 606 and virtual machine (3) 628 may be described.

Figure 7:
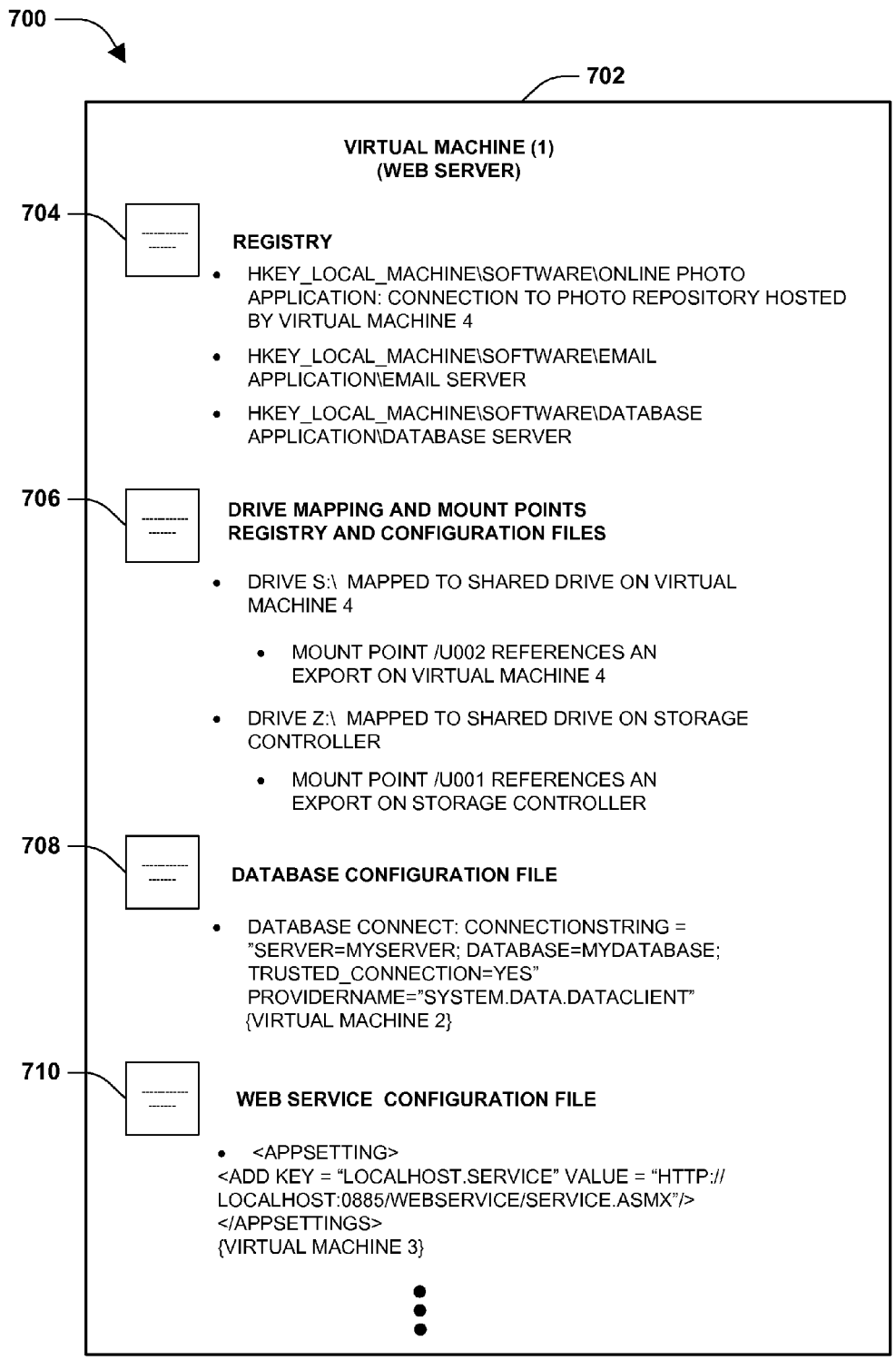
FIG. 7 is an example of configuration data in data structures within a data object associated with a virtual machine.

FIG. 7 illustrates an example 700 of configuration data in data structures within a data object 702 associated with a virtual machine (1). In one example, the virtual machine (1) may be configured as a web server (e.g., as 606 of FIG. 6). The virtual machine (1) may be associated with the data object 702. For example, the data object 702 may comprise one or more files of metadata within a data volume of a storage controller. The data object 702 may represent virtual data of the virtual machine (1), such as an operating system, application binaries, and/or other virtual data.

The data object 702 may comprise data structures, such as an operating system registry 704, a drive mapping configuration 706, a database configuration file 708, a web service configuration file 710, and/or other data structures. The data structures 704, 706, 708, 710, etc. within the data object 702 may comprise configuration data that may be analyzed for dependency relationships. Such dependency relationships may be used to describe virtual machine dependencies. In one example, operating system registry 704 may comprise a first registry entry for an online photo application installed on the virtual machine (1). The first registry entry may indicate that the online photo application references a photo repository hosted by a virtual machine (4). In this way, the first registry entry within the operating system registry 704 may be used to describe a virtual machine dependency between the virtual machine (1) and the virtual machine (4) regarding the online photo application and photo repository dependency relationship. In another example, the operating system registry 704 may comprise a second registry entry for an email application installed on the virtual machine (1). The second registry entry may indicate that the email application may reference an email server hosted by a virtual machine email server within the storage controller. In this way, the second registry entry within the operating system registry 704 may be used to describe a virtual machine dependency between the virtual machine (1) and the virtual machine email server regarding the email dependency relationship. In another example, the operating system registry 704 may comprise a third registry entry for a database application installed on the virtual machine (1). The third registry entry may indicate that the database application may reference a database server hosted by a virtual machine database server within the storage controller. In this way, the third registry entry within the operating system registry 704 may be used to describe a virtual machine dependency between the virtual machine (1) and the virtual machine database server regarding the database dependency relationship.

In another example, the drive mapping configuration 706 may comprise a first drive mapping. The first drive mapping may indicate that a mapped drive S of the virtual machine (1) may be mapped to a shared drive on virtual machine (4). Additionally, the first drive mapping may be associated with a mount point that references an export on the virtual machine (4). In this way, the first drive mapping within the drive mapping configuration 706 may be used to describe a virtual machine dependency between the virtual machine (1) and the virtual machine (4) regarding the mapped drive S dependency relationship. The drive mapping configuration 706 may comprise a second drive mapping. The second drive mapping may indicate that a mapped drive Z of the virtual machine (1) may be mapped to a shared drive on the storage controller. Additionally, the second drive mapping may be associated with a mount point that references an export on the storage controller. In this way, the second drive mapping within the drive mapping configuration 706 may be used to describe a virtual machine dependency between the virtual machine (1) and the shared drive on the storage controller regarding the mapped drive Z dependency relationship.

In another example, the database configuration file 708 may comprise a database connection entry. The database connection entry may indicate that a website hosted by the virtual machine (1) connects to a database provided by a virtual machine (2). In this way, the database connection entry within the database configuration file 708 may be used to describe a virtual machine dependency between the virtual machine (1) and the virtual machine (2) regarding the website and database dependency relationship.

In another example, the web service configuration file 710 may comprise a web service connection entry. The web service connection entry may indicate that the website hosted by the virtual machine (1) connects to a web service provided by a virtual machine (3). In this way, the web service connection entry may be used to describe a virtual machine dependency between the virtual machine (1) and the virtual machine (3) regarding the website and web service dependency relationship.

Figure 8:
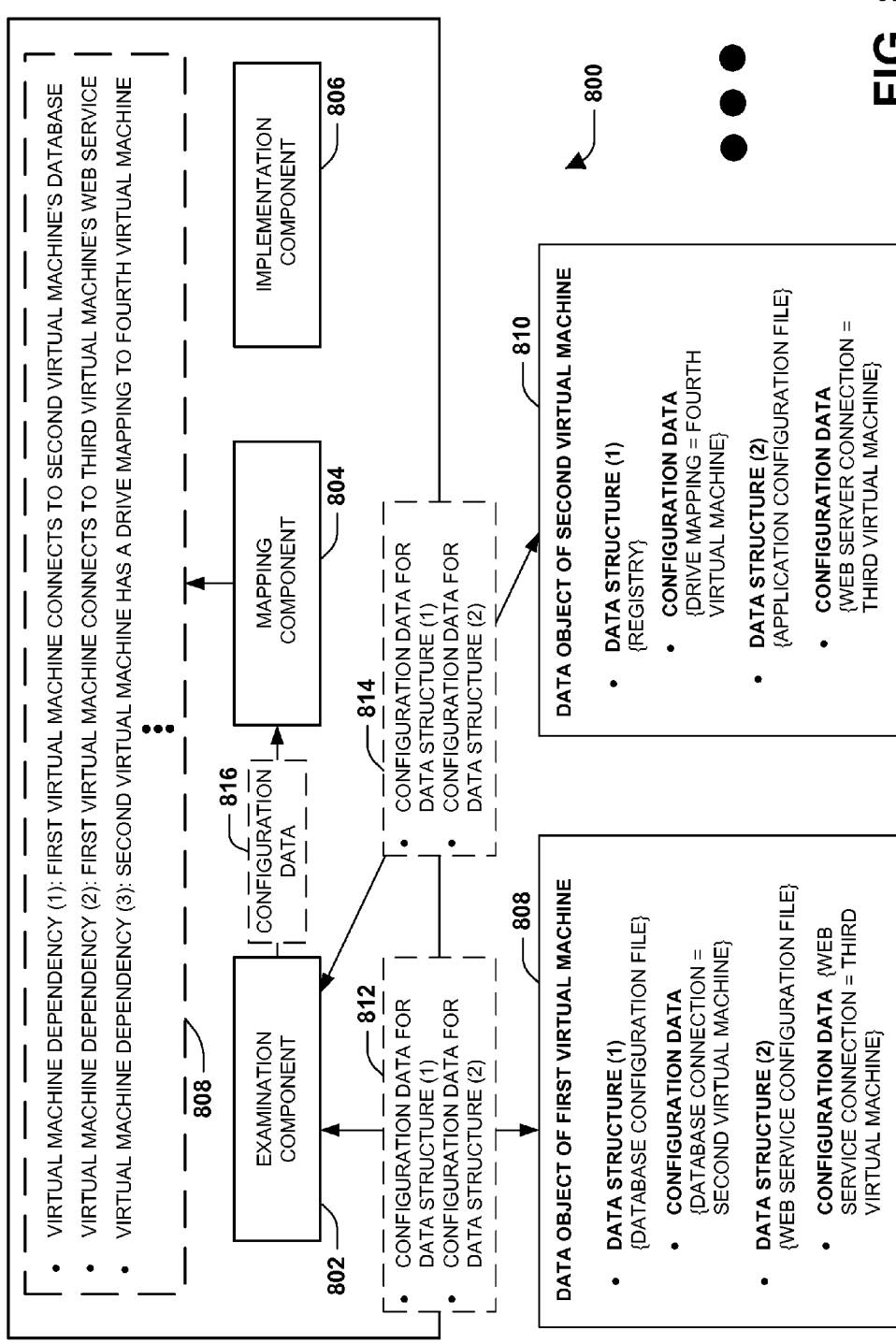
FIG. 8 is a component block diagram illustrating an exemplary system for describing a virtual machine dependency.

FIG. 8 illustrates an example of a system 800 configured to describe one or more virtual machine dependencies 808. System 800 may comprise an examination component 802, a mapping component 804, and/or an implementation component 806. The examination component 802 may be configured to identify data objects associated with virtual machines. For example, the examination component 802 may identify data object 808 associated with a first virtual machine, data object 810 associated with a second virtual machine, and/or other data objects.

The examination component 802 may be configured to examine the data objects to identify data structures comprising configuration data. For example, the examination component 802 may examine data object 808 to identify a database configuration file (data structure 1) and a web service configuration file (data structure 2) for the first virtual machine. The examination component may examine data object 810 to identify a registry entry (data structure 1) and an application configuration file (data structure 2) for the second virtual machine. In this way, data structures comprising configuration data 812 for the first virtual machine, configuration data 814 for the second virtual machine, and/or configuration data for other virtual machines may be identified.

The mapping component 804 may be configured to analyze the configuration data 816 to determine dependency relationships between virtual machines to describe virtual machine dependencies 808. For example, the mapping component may describe a virtual machine dependency (1) based upon a dependency relationship between the first virtual machine and the second virtual machine, a virtual machine dependency (2) based upon a dependency relationship between the first virtual machine and a third virtual machine, a virtual dependency (3) based upon a dependency relationship between the second virtual machine and a fourth virtual machine, and/or other virtual machine dependencies.

The mapping component 804 may be configured to correlate the virtual machine dependencies 808 into a mapping of virtual machine dependencies (e.g., virtual machine dependencies 902 of FIG. 9) indicative of relationships between one or more virtual machines, such as virtual machines within a storage controller. The implementation component 806 may be configured to implement an operational decision for the storage controller based upon the mapping of virtual machine dependencies. It will be appreciated that some or all of system 800 may be implemented in hardware and/or software on a controller, for example (e.g., controller 302 in FIG. 3).

Figure 9:
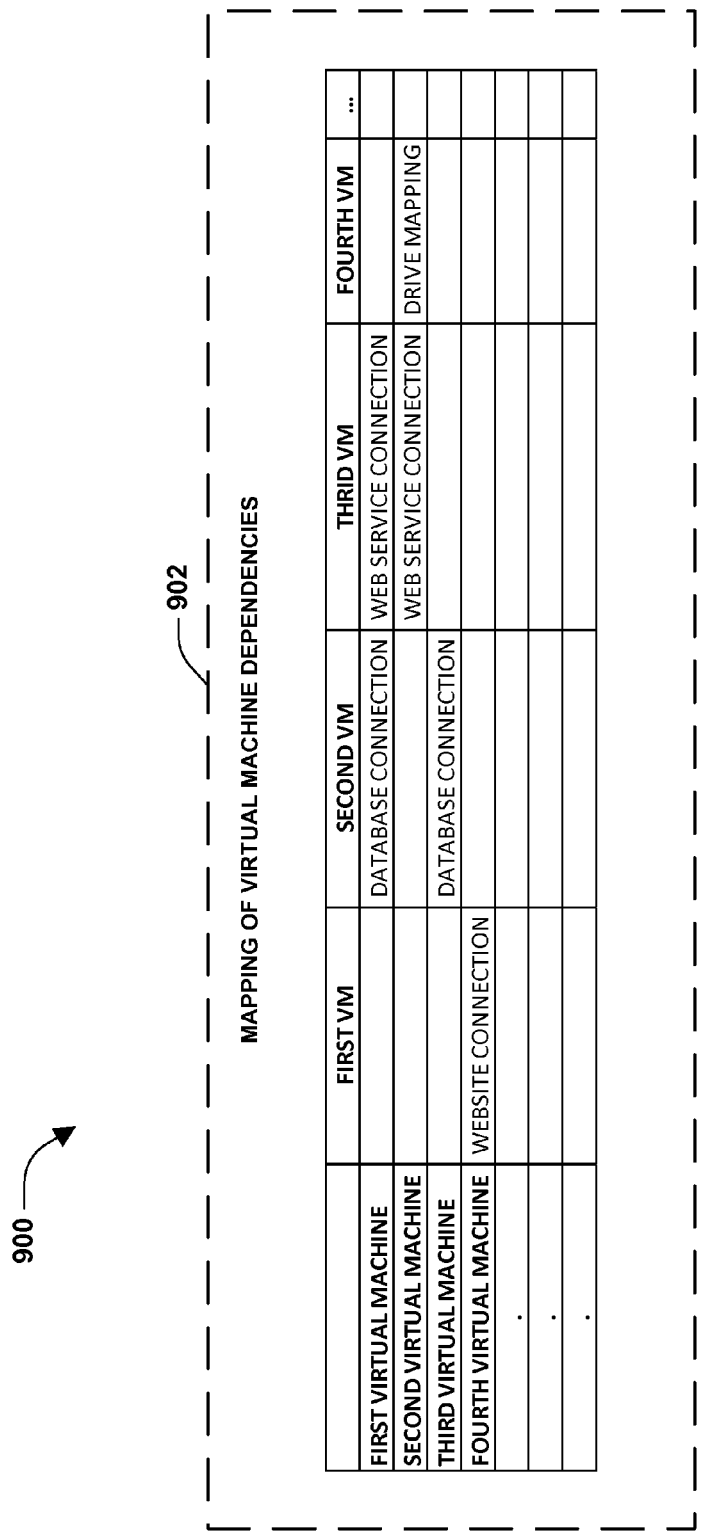
FIG. 9 is an example of a mapping of virtual machine dependencies.

FIG. 9 illustrates an example 900 of a mapping of virtual machine dependencies 902. The mapping of virtual machine dependencies 902 may comprise one or more virtual machine dependencies between virtual machines. For example, a first virtual machine may have virtual machine dependencies with a second virtual machine, a third virtual machine, and/or other virtual machines because the first virtual machine may have dependency relationships with such virtual machines (e.g., the first virtual machine may reference a database hosted by the second virtual machine, the first virtual machine may reference a web service hosted by the third virtual machine, etc.). The second virtual machine may have virtual machine dependencies with the third virtual machine, a fourth virtual machine, and/or other virtual machines because the first virtual machine may have dependency relationships with such virtual machines (e.g., the second virtual machine may reference the web service hosted by the third virtual machine, the second virtual machine may have a mapped drive to a folder provided by the fourth virtual machine, etc.). The third virtual machine may have virtual machine dependencies with the second virtual machine and/or other virtual machines because the third virtual machine may have dependency relationships with such virtual machines (e.g., the third virtual machine may reference the database hosted by the second virtual machine). The fourth virtual machine may have virtual machine dependencies with the first virtual machine and/or other virtual machines because the fourth virtual machine may have dependency relationships with such virtual machines (e.g., the fourth virtual machine may reference a website hosted by the first virtual machine).

It may be appreciated that the mapping of virtual machine dependencies 902 may be described in a variety of ways. In one example, the mapping of virtual machine dependencies 902 may be described as a graph, where nodes may represent virtual machines and edges may represent virtual machine dependencies. For example, the first virtual machine may be represented as a node connected to the second virtual machine, the third virtual machine, and/or other virtual machines with which the first virtual machine has a virtual machine dependency. The second virtual machine may be connected with the third virtual machine, the fourth virtual machine and/or other virtual machines with which the second virtual machine has a virtual machine dependency. The third virtual machine may be connected with the second virtual machine and/or other virtual machines with which the third virtual machine has a virtual machine dependency. The fourth virtual machine may be connected with the first virtual machine and/or other virtual machines with which the fourth virtual machine has a virtual machine dependency.

Figure 10:
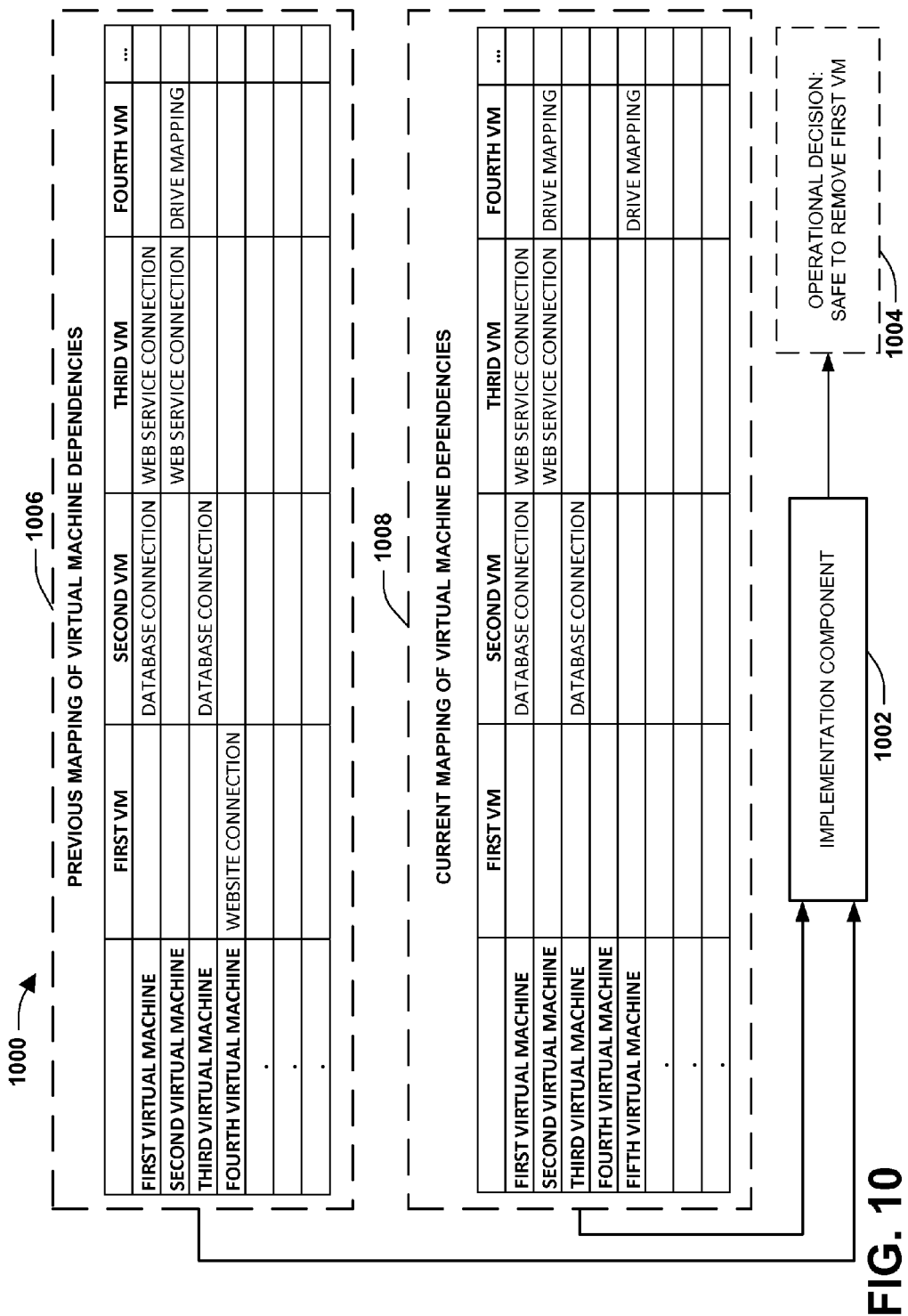
FIG. 10 is an example of an implementation component configured to implement an operational decision based upon a current mapping of virtual machine dependencies and/or a previous mapping of virtual machine dependences.

FIG. 10 illustrates an example 1000 of an implementation component 1002 configured to implement an operational decision 1004 based upon a current mapping of virtual machine dependencies 1008 and/or a previous mapping of virtual machine dependences 1006. The previous mapping of virtual machine dependencies 1006 may have been generated based upon virtual machine dependencies of virtual machines within a storage controller. Over time, modifications may have been made to the storage controller. For example, a fifth virtual machine may have been added to the storage controller, and a fourth virtual machine may have been modified to remove a reference to a website hosted by a first virtual machine. In this way, the current mapping of virtual machine dependencies 1008 may have been generated.

The implementation component 1002 may be invoked to perform the operational decision 1004 to delete the first virtual machine. Previously, it may have been unsafe to delete the first virtual machine based upon the previous mapping of virtual machine dependencies 1006 because the fourth virtual machine had a dependency relationship with the website hosted by the first virtual machine. However, the current mapping of virtual machine dependencies 1008 indicates that no virtual machines depend upon the first virtual machine (e.g., the fourth virtual machine was modified to remove the reference to the website hosted by the first virtual machine). Thus, it may be safe to remove the first virtual machine through the operational decision 1004. It can thus be appreciated that determining dependency relationships as provided herein allows, among other things, virtual machines to be deleted, repurposed, etc. with little to no adverse effect on other virtual machines.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 11:
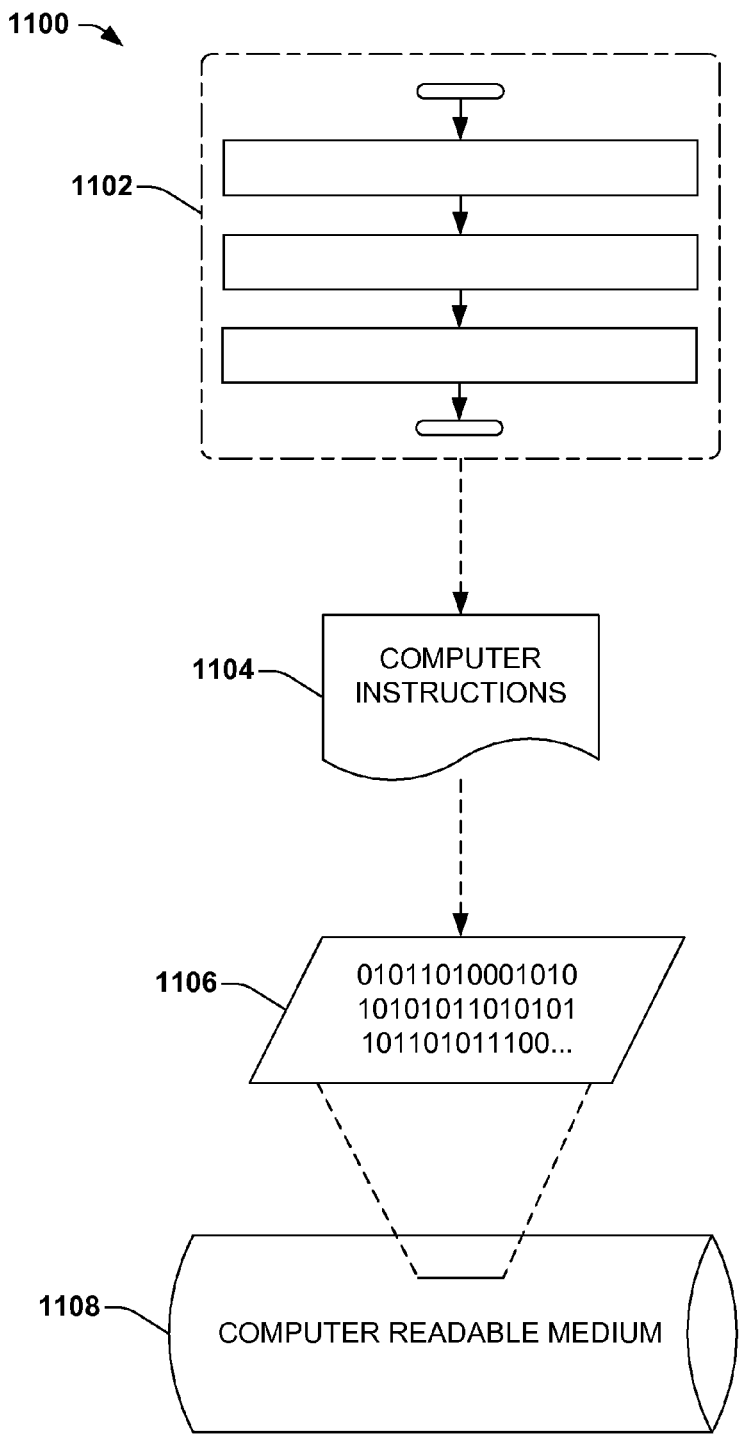
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 400 of FIG. 4 or method 500 of FIG. 5, for example, as well as at least some of a system, such as at least some of the system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form. Additionally, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for describing a virtual machine dependency of a first virtual machine depending upon a second virtual machine, comprising:
   identifying a data object associated with a first virtual machine, the identifying comprising identifying a guest file system of the first virtual machine;
   examining the data object to identify a data structure comprising configuration data, the examining comprising searching metadata of the guest file system for one or more data blocks comprising the data structure; and
   analyzing the configuration data to determine a dependency relationship between the first virtual machine and a second virtual machine to describe a virtual machine dependency, the analyzing comprising searching the configuration data for a reference to the second virtual machine.

2. The method of claim 1, the metadata of the guest file system comprising a master file table identifying the one or more data blocks.

3. The method of claim 1, the metadata of the guest file system comprising at least one of:
   a master boot record; or
   a partition table.

4. The method of claim 1, the data object comprising a virtual hard drive data object, and the data structure comprising a configuration file within the virtual hard drive data object.

5. The method of claim 1, the data object associated with at least one of:
   a logical unit number; or
   an operating system and application binaries of the first virtual machine.

6. The method of claim 1, the data structure comprising at least one of:
   an operating system registry;
   a database file;
   an application configuration file;
   a network configuration file;
   a storage configuration file; or
   an operating system configuration file.

7. The method of claim 1, the analyzing the configuration data comprising:
   determining the dependency relationship between the first virtual machine and the second virtual machine based upon the data structure of the first virtual machine referencing the second virtual machine within the configuration data.

8. The method of claim 1, comprising:
   correlating one or more virtual machine dependencies into a mapping of virtual machine dependencies indicative of dependency relationships between one or more virtual machines hosted by a storage controller, the one or more virtual machines comprising the first virtual machine.

9. The method of claim 8, the mapping of virtual machine dependencies comprising at least one of:
   the first virtual machine having a dependency relationship with the second virtual machine;
   the first virtual machine having a dependency relationship with a third virtual machine; or
   the third virtual machine having a dependency relationship with the first virtual machine and a fourth virtual machine.

10. The method of claim 8, comprising:
    updating the mapping of virtual machine dependencies with one or more virtual machine dependences corresponding to a new virtual machine based upon determining the new virtual machine was added to the storage controller.

11. The method of claim 8, comprising:
    correlating one or more new virtual machine dependencies into a second mapping of virtual machine dependencies; and
    comparing the mapping of virtual machine dependencies with the second mapping of virtual machine dependencies to determine virtual machine relationship changes between one or more virtual machines.

12. The method of claim 1, comprising:
    implementing an operational decision for a storage controller, hosting at least one of the first virtual machine or the second virtual machine, based upon the virtual machine dependency.

13. The method of claim 12, the operational decision comprising at least one of:
    maintenance of the storage controller;
    modification of a virtual machine hosted by the storage controller;
    modification of an application of the virtual machine; or
    modification of a service provided by the virtual machine.

14. The method of claim 1, the configuration data retrieved from an application file, and the method comprising:

confirming the configuration data based at least in part upon information from a guest operating system configuration.

15. A system for describing a virtual machine dependency, comprising:
one or more processors; and
memory comprising instructions that when executed by at least one of the one or more processors implement at least some of:
an examination component configured to:
identify a data object associated with a first virtual machine; and
examine the data object to identify a data structure comprising configuration data, the data object comprising at least one of:
a logical unit number, or
an operating system and application binaries of the first virtual machine; and
a mapping component configured to:
analyze the configuration data to determine a dependency relationship between the first virtual machine and a second virtual machine to describe a virtual machine dependency.

16. The system of claim 15, the examination component configured to identify a second data object associated with the first virtual machine, and examine the second data object to identify a second data structure comprising second configuration data; and the mapping component configured to analyze the second configuration data to determine a second dependency relationship between the first virtual machine and a third virtual machine to describe a second virtual machine dependency.

17. The system of claim 15, the mapping component configured to:
determine the dependency relationship between the first virtual machine and the second virtual machine based upon the data structure of the first virtual machine referencing the second virtual machine within the configuration data.

18. The system of claim 15, the mapping component configured to:
correlate one or more virtual machine dependencies into a mapping of virtual machine dependencies indicative of relationships between one or more virtual machines within a storage controller, the one or more virtual machines comprising the first virtual machine.

19. The system of claim 18, comprising:
an implementation component configured to:
implement an operational decision for the storage controller based upon the mapping of virtual machine dependencies.

20. A non-transitory computer readable medium comprising computer executable instructions that when executed by a processor perform a method for identifying one or more virtual machine dependencies, comprising:
identifying a virtual hard drive data object associated with a first virtual machine hosted by a storage controller configured to host one or more virtual machines;
examining the virtual hard drive data object to identify a configuration file comprising configuration data;
analyzing the configuration data to describe a virtual machine dependency of the first virtual machine depending upon a second virtual machine; and
correlating one or more virtual machine dependencies into a mapping of virtual machine dependencies indicative of dependency relationships between one or more virtual machines hosted by the storage controller, the one or more virtual machines comprising the first virtual machine.

21. The method of claim 20, comprising:
comparing the virtual machine dependency with one or more prior virtual machine dependencies associated with the first virtual machine to determine a virtual machine relationship change.

22. The method of claim 21, comprising:
implementing an operational decision for the storage controller based upon the virtual machine relationship change.

* * * * *